United States Patent
Lin et al.

(10) Patent No.: US 7,969,595 B2
(45) Date of Patent: Jun. 28, 2011

(54) INTERNET PRINTING

(76) Inventors: Feng Lin, Singapore (SG); Ling Su, Singapore (SG)

( * ) Notice: Subject to any disclaimer, the term of this patent is extended or adjusted under 35 U.S.C. 154(b) by 779 days.

(21) Appl. No.: 10/587,890

(22) PCT Filed: Sep. 20, 2004

(86) PCT No.: PCT/SG2004/000305
§ 371 (c)(1),
(2), (4) Date: Jul. 31, 2006

(87) PCT Pub. No.: WO2005/083555
PCT Pub. Date: Sep. 9, 2005

(65) Prior Publication Data
US 2007/0159504 A1   Jul. 12, 2007

(30) Foreign Application Priority Data

Mar. 1, 2004  (SG) ............... PCT/SG2004/000044
Jun. 1, 2004  (SG) ............... PCT/SG2004/000162

(51) Int. Cl.
*G06F 3/12*  (2006.01)
*G06K 15/00* (2006.01)

(52) U.S. Cl. .................... 358/1.15; 358/1.14

(58) Field of Classification Search ............. 358/1.14, 358/1.15; 707/10
See application file for complete search history.

(56) References Cited

U.S. PATENT DOCUMENTS

| 4,843,571 | A  | * | 6/1989  | Notermans et al. | 358/1.18 |
| 6,044,372 | A  | * | 3/2000  | Rothfus et al.   | 707/10   |
| 6,184,996 | B1 | * | 2/2001  | Gase             | 358/1.15 |
| 6,307,640 | B1 | * | 10/2001 | Motegi           | 358/1.14 |
| 6,623,527 | B1 | * | 9/2003  | Hamzy            | 715/234  |
| 6,738,841 | B1 | * | 5/2004  | Wolff            | 710/62   |
| 6,778,289 | B1 | * | 8/2004  | Iwata            | 358/1.15 |
| 6,978,299 | B1 | * | 12/2005 | Lodwick          | 709/223  |
| 7,177,043 | B2 | * | 2/2007  | Qiao             | 358/1.15 |
| 2003/0086124 | A1 | * | 5/2003 | Parry            | 358/402  |

FOREIGN PATENT DOCUMENTS

EP           886206 A2  * 12/1998
WO    WO 0120472 A1    *  3/2001

* cited by examiner

*Primary Examiner* — Benny Q Tieu
*Assistant Examiner* — Sunil Chacko

(57) ABSTRACT

A network printer for users printing documents in the Internet contains a keypad, when a user on the keypad enters a number, the printer sends the number to a first server; the first Internet server translates the number into the URL of a document in a second server in the Internet, and sends the URL to the printer; according to the URL, the printer retrieves the document from the second server via Internet, and prints the document.

3 Claims, 4 Drawing Sheets

INTERNET PRINTING

BACKGROUND OF THE INVENTION

1. Field of the Invention

This invention relates to a network printing method for printing documents on the Internet.

2. Description of Related Art

On the Internet, we use browser to view and print the web pages while needing. For example, you read an advertisement of a credit card in a newspaper, you are interested in it and want to apply. So you may call the bank, view the website of the bank or search the Internet to get an application form. Processing to get the application form is still a time-consuming and bored work, especially if you are a person who don't use computer or don't like it at all. So some convenient and alternative approaches are expected.

SUMMARY OF THE INVENTION

An object of the present invention is to provide an easy and simple way for people to print documents on the Internet without using the personal computer and web browser.

A local network printing system includes a LAN, a server, network printers and network keypads. The server connects by use of the LAN to the printers and keypads. A method for printing a document in the network printing system includes: (1) a user presses number keys to enter document number on a keypad; (2) the keypad sends to the server a print-request that includes the document number and the keypad IP address; (3) the server receives the print-request and identifies the document and the keypad; (4) the server, in accordance with an assignment that assigns documents to keypads, determines an appropriate document among the documents that are assigned to the keypad; (5) in order to print the document at an appropriate printer such as near to the user and suitable to print the document, the server, in accordance with another assignment that assigns printers to keypads, determines an appropriate printer among the printers that are assigned to the keypad; (6) the server retrieves the appropriate document; and (7) the server prints the document to the appropriate printer via the LAN.

Using Print Number System (PNS) and Universal Resource Locator (URL), a method for the local network printing system to print documents on the Internet, includes: (1) use URLs to describe how to retrieve documents on the Internet; (2) store the URLs in PNS server, and represent the URLs as print numbers; (3) thereafter, in the local network printing system, the user enters a print number in a keypad; (4) the keypad sends the number to the local server; (5) the local server sends the number to PNS server; (6) PNS server translates the print number into the URL on how to retrieve the document, and sends the URL to the local server; (7) according to the URL, the local server retrieves the document over the Internet; and (8) the local server prints the document at an appropriate printer according to the keypad.

BRIEF DESCRIPTION OF THE DRAWINGS

(FIG. 1-4 has been described in the priority patent applications PCT/SG2004/000044 and PCT/SG2004/000162 of same inventors.)

DETAILED DESCRIPTION OF THE PREFERRED EMBODIMENTS

Preferred embodiments of the present invention will now be described in details with reference to the accompanying drawings.

Figure 1:
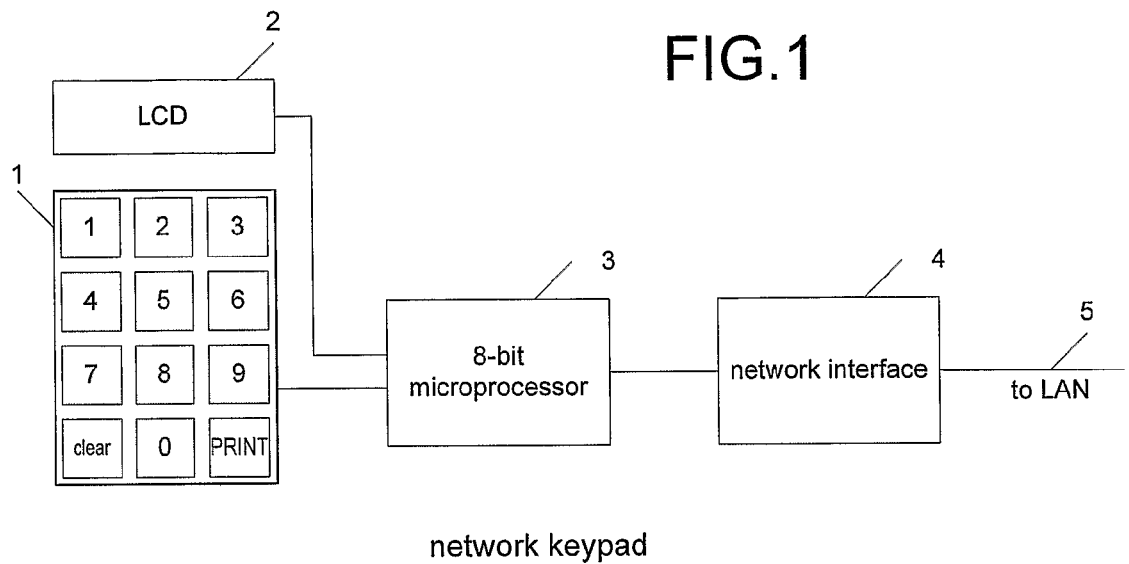
FIG. 1 is a block diagram of a network keypad according to the present invention.

FIG. 1 is a block diagram of a network keypad according to the present invention.

Figure 2:
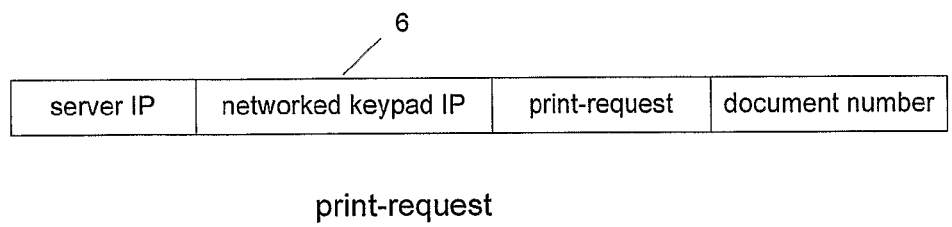
FIG. 2 is a data packet of the print-request issued by a network keypad according to the present invention.

FIG. 2 is a data packet of the print-request issued by a network keypad according to the present invention.

A network keypad of the present invention consists of keypad 1, LCD 2, 8-bit microprocessor 3 and network interface 4. Keypad 1 has number keys 0-9 and PRINT key. A user can press number keys to enter (select) a document number, such as press 1001 to select document "1001"; after that, press PRINT key to issue a print-request 6 to a server. LCD 2 shows the document number and other status. Network interface 4 connects the network keypad to LAN 5. And 8-bit microprocessor 3 controls keypad 1, LCD 2 and network interface 4, and processes user's requests.

Microprocessor 3 runs the TCP/IP protocol, and a server IP address is set up in its memory, so the network keypad can communicate to the server, and send the data packet of the print-request 6. FIG. 2 shows the fields of a print-request 6, including the server IP address, the network keypad IP address, the identification of the print-request, and the document number.

An 8-bit microprocessor module RCM2200 (a product of Rabbit Semiconductor), which includes microprocessor, memory, network interface and input/output ports for connecting to additional LCD and keypad, can be used to build a network keypad easily and at low cost.

By using the network keypad, the steps for a user to print a document such as document "1001" are: (1) the user presses keys 1001 and PRINT key on keypad 1; (2) microprocessor 3 gets 1001 as document number, and issues a packet of the print-request 6 to a server via LAN 5; (3) the server prints document "1001" at the appropriate printer, which is near to the user and suitable for printing document "1001".

One advantage of the invention is the simple and easy operation: by pressing a few keys (such as number keys 1001 and PRINT key) only, a user can select and print a document ("1001"). And another advantage is that the network keypad is low cost.

Figure 3:
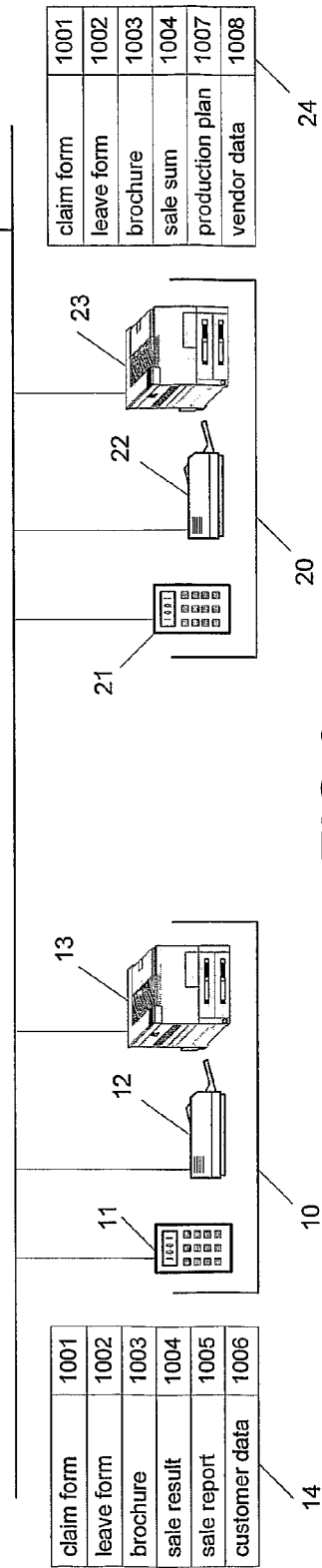
FIG. 3 illustrates a network printing system according to the present invention.

FIG. 3 illustrates a network printing system according to the present invention.

The network printing system comprises a LAN 5, a server 7, four network printers and two network keypads. The network keypad has been described in FIG. 1 and FIG. 2. The four printers and two keypads are installed in two printer rooms. Printer room 10 has a laser printer 12, a color laser printer 13 and a network keypad 11; and printer room 20 has a laser printer 22, a color laser printer 23 and a network keypad 21. Server 7 connects by use of LAN 5 to the four printers and two keypads. The TCP/IP network protocol and the Ethernet run on LAN 5, to send and receive data packets between server 7 and network printers and keypads.

Server 7 is a computer (or multiple computers) running on a Microsoft Windows 2000 operating system. Printers 12 and 22 are HP LaserJet 1300n/4200n network printers; and printers 13 and 23 are HP color LaserJet 3500n network printers. A network printer includes a printer system and an internal network card, an internal print server or an external print server.

Server 7 stores documents on the disk. Table 8 has a column labeled "Document" that lists examples: "claim form.prn", "leave form.doc" and "color brochure.prn". However, server 7 may produce or import documents, e.g. by accessing a database. The documents are saved as either printer-specific data or program-specific data. For example, the document "claim form.prn" is saved as printer-specific data (such as HP PCL and PostScript. One method to create printer-specific data is to print to a file from the application using the driver for the selected printer). To print such document, server 7 sends directly the document via LAN 5 to the printer, for example, sends HP PCL data files (documents) over a TCP connection to TCP port 9100 on HP LaserJet 1300n/3500n printers. Another document "leave form.doc" is saved as program-specific (Microsoft Word) data. To print the document, server 7, by invoking the COM interface of Microsoft Word, launches the program, loads the document and prints it at the printer through a network printer software driver.

Server 7 includes table 8 that uses numbers to represent documents. For example, in the row 1 number "1001" represents the document "claim form.prn"; in the row 2 number "1002" represents the document "leave form.doc" and so on. The documents "claim form.prn", "leave from.doc" and "color brochure.prn" are simply referred to as documents "1001", "1002" and "1003" elsewhere in the description. By representing documents as numbers, a user can easily use a simple keypad to indicate the document that he wants to print. For example, a user can press number "1001" on a keypad if he wants to print the document "claim form.prn".

In order for server 7 to determinate an appropriate destination printer (such as near to a user or suitable to print a document), table 8 (now called as assignment table) includes columns named "Keypad 11" and "Keypad 21", which assign printers to keypads. As printer 12, 13 and keypad 11 are all at the printer room 10, in column "Keypad 11" printers 12 and 13 are assigned to keypad 11; and as printers 22, 23 and keypad 21 are all at the printer room 20, in column "Keypad 21" printers 22 and 23 are assigned to keypad 21. The meanings of the assigning are: (1) if server 7 receives a print-request 6 from keypad 11, in accordance with column "Keypad 11", it selects one of the assigned printers 12 and 13, which are near to the user (keypad 11), as the destination printer; and (2) if server 7 receives a print-request 6 from keypad 21, in accordance with column "Keypad 21", it selects one of the assigned printers 22 and 23, which are near to the user (keypad 21), as the destination printer.

Refer to assignment table 8, the following examples describe how server 7 selects an appropriate destination printer according to the assignment of printers to keypads:

EXAMPLE 1

Server 7 receives a print-request for document "1001" from keypad 11. The number 1001 is in Row 1, and printer 12 is at the intersection of Row 1 and the column "Keypad 11", so server 7 selects the printer 12 as the destination printer to print the document "1001".

EXAMPLE 2

Server 7 receives a print-request for document "1003" (i.e. color brochure) from keypad 11, server 7 selects the color printer 13, which is at the intersection of the Row 3 and the column "Keypad 11", as the destination printer.

EXAMPLE 3

Server 7 receives a print-request for document "1002" from keypad 11. Printers 12 and 13 are at the intersection of Row 2 and the column "Keypad 11", so server 7 tries to use the printer 12 first. However, if printer 12 is busy or out of order, server 7 prints the document "1002" at the printer 13.

EXAMPLE 4

Server 7 receives a print-request of document "1001" from keypad 21, so server 7 selects the printer 22, which is at the intersection of the Row 1 and the column "Keypad 21 ".

Assigning a plurality of printers to a keypad can make sure to print the document in the appropriate printer, for example, print a simple form at a black-white printer, but print a brochure at a color printer; print a multi-page data sheet at a two-sided printing printer; and print at another appropriate printer when the first destination printer is busy. One advantage of the invention is to print documents at suitable printers.

EXAMPLE 5

Server 7 receives a print-request of document "1004" from keypad 11, it prints "sale result" of Row 4 at printer 12 or 13. However if server 7 receives a print-request of the same document "1004" from keypad 21, it prints "sale summary" of Row 5 because there is no printer in Row 4 for keypad 21, but Row 5 is for document "1004" too, and there is printer 22. This assignment allows several documents to be under one document number. Another object of this assignment is: if offices have several types (laser, inkjet), brands (HP, Canon) or print languages (PCL, PostScript) of printer, the printer-specific data of one document are different among these printers, so there should be a plurality of files (documents) under one document number such as one for print language PCL printer and another for print language PostScript printer. This shows that printed documents are selected according to the keypad and printer, and when the user selects a document, the server determines the printed document according to the keypad and printer.

We can understand that an assignment may allow to print a document at a printer but not at another one; and when server 7 receives a print-request from a keypad and determinates one or more destination printers, these destination printers further determinate the printed selected document. That is, server 7 determines printed document according to the assignment of documents to printers.

EXAMPLE 6

Server 7 receives a print-request of document "1005" from keypad 11, it prints document "1005" at printer 13. However if server 7 receives a print-request of document "1005" from keypad 21, it does not print document "1005", because there is no printer at the intersection of Row 6 and column "Keypad 21", or the document "1005" is not assigned to Keypad 21. This assignment of documents to keypads separates and protects documents of different groups or departments. Let's see a clearer description.

For example, keypad 11 is in the sale department, and keypad 21 is in the production department. In order for the user to know the document numbers, server 7 prints an index sheet 14 for keypad 11, which lists all documents that keypad 11 can request to print according to table 8; and server 7 also prints another index sheet 24 for keypad 21, which lists all documents that keypad 21 can request to print according to table 8. In the index sheet 14 of sale department, it lists the documents related with sale department i.e. "1005 sale report" and "1006 customer data", but does not include the documents related with production department i.e. "1007 production plan" and "1008 vendor data". In the index sheet 24 of production department, it lists the documents related with production department i.e. "1007 production plan" and "1008 vendor data", but does not include the documents related with sale department i.e. "1005" and "1006". With this assignment of documents to keypads, the persons of sale department can print documents of their own department, but cannot print documents of production department; and the persons of production department can print documents of their own department, but no documents of sale department. This shows more clearly that documents are selected and printed according to the keypad, and when the user selects a document, the server determines the (printed) selected document according to the keypad.

EXAMPLE 7

A keypad is in a public place, and use password to prohibit unauthorized access. Key 9 in the column header "Keypad 21" shows that keypad 21 (such as in reception room) is protected by password. For example, refer to Row 1, when server 7 receives a print-request of document "1001" from keypad 11, it knows the request from keypad 11, and prints the document at printer 12 immediately. However if server 7 receives a print-request from keypad 21, it knows the request came from keypad 21, and asks for password before print to printer 22.

All above examples show that server 7 determines a destination printer and printed document relying on assignments of printers and documents to keypads. So when server 7 receives a print-request, it needs to know which keypad issues the request, that is, the packet of the print-request 6 arrives at server 7 with the identification information of the network keypad. The keypad IP address is convenient and preferred to be the identification information of the network keypad. However, unique data may be assigned to the keypad as its identification.

In the preferred embodiment, server 7 includes assignment table 8, and when server 7 operates according to the invention, it loads table 8 to its memory. However, the assignment in table 8 may be stored to each keypad either by downloading from server 7 or by an IT administrator.

A example: because in the column "Keypad 11" printers 12 and 13 are assigned to keypad 11, server 7 downloads the identification information of printers 12 and 13 to keypad 11. Thereafter, if keypad 11 issues a print-request, the print-request includes the identification information of printers 12 and 13. When server 7 receives the print-request, according to table 8 and the document number in the print-request, server 7 determines an appropriate destination printer among printers 12 and 13. For example, for document "1001" server 7 selects printer 12, but for document 1003 it selects printer 13.

Summarily, the information in the print-request of a keypad assists server 7 to determine a destination printer, and the destination printer is among the printers that are assigned to the keypad.

Figure 4A:
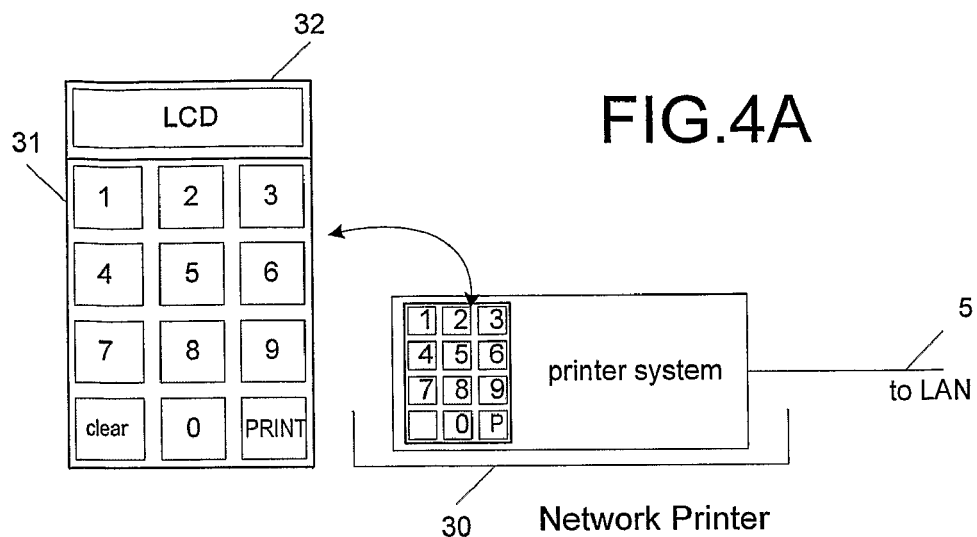
FIGS. 4A and 4B are block diagrams of a network printer with the function of network keypad on printer or its print server according to the present invention.
Figure 4B:
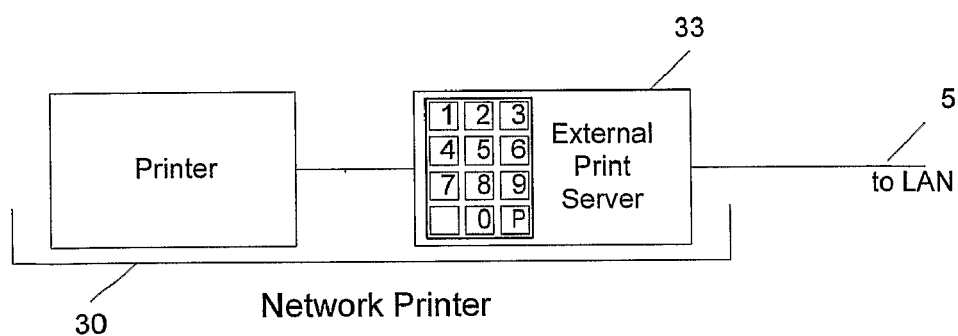

FIGS. 4A and 4B are block diagrams of a network printer with the function of network keypad on printer or its print server according to the present invention.

The network keypad of FIG. 1 has limited hardware and size is small, and a network printer 30 or its print server 33 has microprocessor and network interface, so the keypad tends to be built-in and mount on the printer 30 or its print server 33 to become as a part of the printer 30. Such printer 30 or its print server 33 has a keypad 31, and uses directly the microprocessor and network interface of printer 30 or print server 33 to issue the print-request 6, to cause server 7 to print documents at printer 30 or at other printer according to assignment table 8. After understand the invention, skillful persons in the printer art can develop the new printers or print server that include the network keypad of the invention.

Now refer to FIG. 1-4, in the network printing system of the invention, the overall procedures for printing document are described:

(1) in keypads 11 and 21, store their local IP addresses and server 7 IP address;

(2) on the disk of server 7, store documents "claim form.prn", "leave form.doc" and "color brochure.prn", and use numbers "1001", "1002", "1003" to represent these documents;

(3) in server 7, establish the assignment table 8 that assigns printers to keypads; or now the network printing system is ready to print documents for users, (4) a user presses keys such as 1001 and PRINT key on keypad 11;

(5) keypad 11 sends a packet of print-request 6 to server 7, the print-request 6 includes number "1001", IP address of server 7, and IP address of keypad 11;

(6) server 7 receives the print-request 6 and identifies the number "1001", then server 7, according to the row 1, retrieves the document "1001", i.e. the document "claim form.prn";

(7) server 7 checks IP address in the print-request 6, and knows that keypad 11 issues the print-request 6. Then server 7 selects printer 12, which is at the intersection of the row 1 (document "1001") and the column "Keypad 11", as the destination printer;

(8) server 7 checks file extension (i.e. ".prn", and ".doc") to determine the date type of documents. If a document is at printer-specific data such as HP PCL, server 7 sends the document to printer 12; however, if a document is at program (such as Microsoft Word) specific data, server 7 loads the document to the program by using COM technology; and (9) finally, server 7 prints the document "claim form.prn" at the destination printer 12 via LAN 5.

Figure 5:
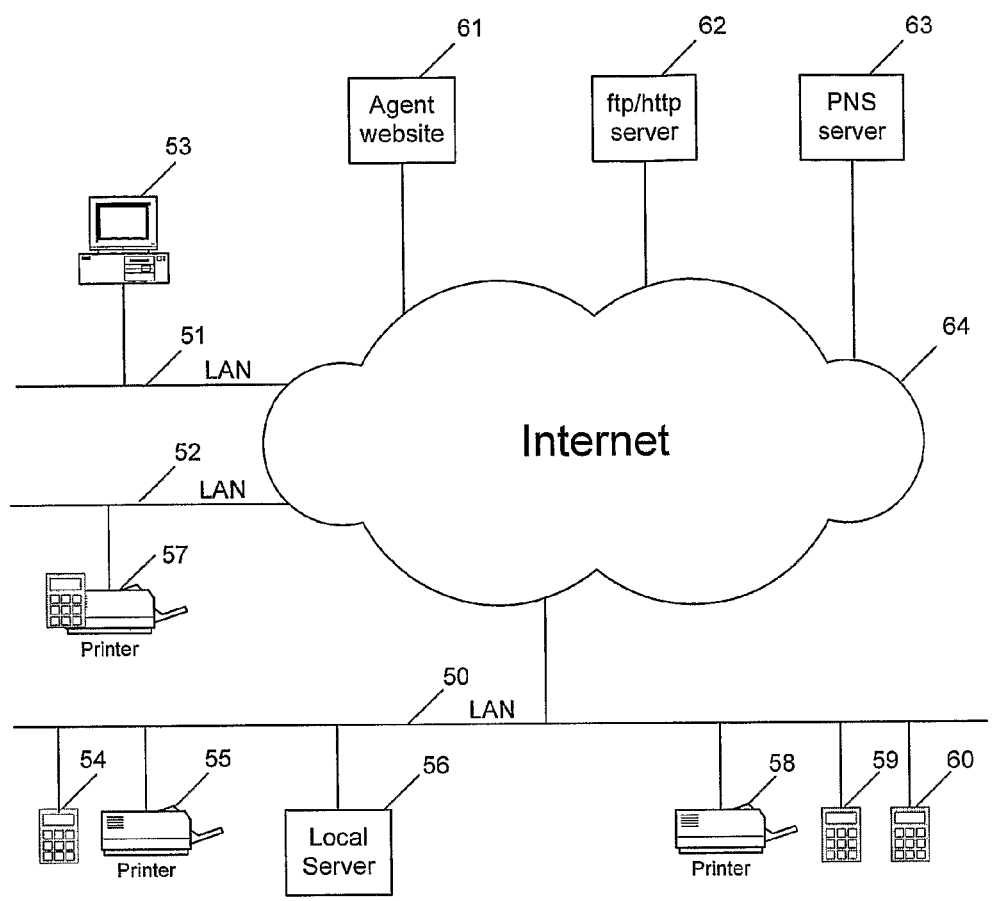
FIG. 5 illustrates the Internet printing methods according to the present invention.

FIG. 5 illustrates the Internet printing methods according to the present invention.

Refer to FIG. 5, we study user cases and highlight the related technologies.

User Case 1

The user (Don, a personnel of a Bank) prepares an advertisement of a credit card to be published in the newspaper, and an application form for public to apply the card. Due to the cost, the Bank decides not to publish the application form in the newspaper but to let the public print.

1. In LAN 51, after preparing the advertisement and application form of the credit card in his computer 53, Don selects both PS and PCL printer drivers to print the application form as the PS- and PCL-formatted files respectively.
2. Using browser, Don views the web page of an agent website 61.
3. Following instructions of the web page, Don uploads the PS- and PCL-formatted files to website 61, and then the website assigns a unique print number (PN) such as 0-8888-0001 to Don.

4. Website 61 stores both files in ftp server 62. In print number system (PNS) server 63, Website 61 registers the URLs information about how to retrieve the both files from ftp server 62, and the unique print number 0-8888-0001 is used to represent the URLs, such as [PN:0-8888-0001]=[URLs: ftp retrieving server62//088880001.ps for PS printer; and server62//088880001.pcl for PCL printer]. This makes it possible to use printers located anywhere in the world to print the application form.
5. The advertisement is published in the newspaper, with the PN:0-8888-0001 referring to the application form, like Card Application Form PN:0-8888-0001.
6. In the newspaper, someone (Ira) knows the credit card and wants to apply.
7. In the office or print shop (LAN 50), Ira enters the print number 0-8888-0001 in keypad 54.
8. Keypad 54 sends a print request with the number 0-8888-0001 to local server 56, which finds it is not the local number, so sends the number to PNS server 63, and asks how to get the file with the print number 0-8888-0001.
9. PNS server 63 translates the print number into the related URLs, and sends back a reply containing the URLs that server 56 needs to retrieve the file, such as above [URLs: ftp retrieving server62//088880001.ps for PS printer; and server62//088880001.pcl for PCL printer].
10. Executing the URL: ftp retrieving server62//088880001.ps, server 56 logins to ftp server 62, and selects and downloads the file 088880001.ps, as server 56 knows that printer 55 supports PS-formatted printing.
11. Finally, server 56 prints the file (i.e. application form of the credit card) in printer 55. Technical highlight. Above steps are easily understood and implemented by the skilled persons in the computer and network related technologies.

In step 3, uploading the file to and getting the reply (print number) from the website is common skill now. The print number is unique, helping to map the print number to the related (Universal Resource Locator) URLs correctly. The print number can be the Universal Resource Name (URN).

In step 4, the PNS server is a single computer or multiple computers with distributed databases (like DNS server of Internet), which store print numbers and URLs information, and provide print number-to-URL mapping. The URLs information contains the instructions that the computer or printer needs to retrieve and print the document, for example, it contains URLs of the documents, and requirements of printer capabilities such as printer language and paper size.

In step 7-10, the function of keypad 54 and server 56 have been described in FIG. 1-3 and the LAN 50 is described as LAN 5 in FIG. 3. In step 8, the IP address or name of PNS server 63 is configured in server 56.

User Case 2

The user (Alan, a university's student) writes a paper in the computer, and wants to print it in a laser printer, but he has no laser printer. He knows that the print shop and school library have HP laser printers.
1. In LAN 51, after writing his paper in computer 53, Alan selects a printer driver and prints the paper as a HP PCL-formatted file.
2. Alan views the web page of agent website 61 in computer 53.
3. Following instructions of the web page, Alan uploads the PCL-formatted file to the website, and as an option, Alan inputs a password. And then the website assigns a unique print number such as 0412-8888-0002 to Alan.
4. Website 61 stores the PCL-formatted file in ftp server 62. And in PNS server 63, website 61 registers the URL about how to retrieve the file from ftp server 62, and the unique print number 0412-8888-0002 is used to represent the URL, such as [PN: 0412-8888-0002]=[URL: ftp retrieving 041288880002: password_needed@server62//041288880002].
5. Later at the school library (LAN 52), Alan inputs print number 0412-8888-0002 in the keypad of laser printer 57.
6. Printer 57 sends the print number to PNS server 63 to ask how to retrieve the file related to the number 0412-8888-0002.
7. PNS server replies that the file is at [URL: ftp retrieving 041288880002:password_needed@server62//041288880002].
8. Printer 57 prompts Alan for password, and Alan inputs it in the keypad of printer 57.
9. Executing URL: ftp retrieving 041288880002: Alan_password@server62//041288880002, printer 57 logins to ftp server 62, and downloads the file 041288880002.
10. Finally, printer 57 prints the file 041288880002, that is, Alan's paper.

Highlight. FIG. 4 describes Printer 57 partly. Printer has computer components, so it can be programmed to include more network capabilities and run network protocols like ftp and http client to download data. Therefore, in order to fulfill some of the above steps that require more network capabilities of printer 57 than regular network printer, persons with the skills of computer, network and printer related technologies are able to design printer 57 or enhance regular network printer to have the capabilities of ftp and http clients, and the access to other servers (in this case, PNS server). And, if printer 57 is an Internet Printing Protocol (IPP) ready printer, server 62 using the http can print the file directly to printer 57.

In LAN 52 of the case, notes that there is not a server like server 56 of user case 1, and the address or name of PNS server 63 is configured in printer 57 in advance.

User Case 3

The user (Ida) wants to print her bank account statement in her office printer.
1. In PNS server 63, the bank registers a range of bank account number as print number, and the related URL, such as [(bank account number) PN:3333-xxxx-xxxx]= [URL: http retrieving bank_server//statement.asp id=3333-xxxx-xxxx, password=?printer_capability=?].
2. In Ida's office LAN 52, Ida in the keypad of printer 57 enters her account number such as 3333-0000-1110.
3. Printer 57 sends the account number to PNS server 63, and asks for the URL related to the number 3333-0000-1110.
4. Finding that this number belongs to the bank, according to bank registered URL, PNS server 63 replies [URL: http retrieving bank_server//statement.asp id=3333-0000-1110 password=? printer capability=?].
5. Printer 57 prompts Ida for password, and Ida enters in the keypad of printer 57.
6. Executing URL: http retrieving bank_server//statement.asp id=3333-0000-1110 password=Ida_pw printer_capability=PCL/A4, printer 57 sends the http request to bank server.
7. Bank server responds this http request, produces a statement of account 3333-0000-1110 at the format suitable for printer 57, and sends to printer 57.
8. Printer 57 prints Ida's statement.

User Case 4

The user (Joe) goes to see doctor in a clinic. The doctor gives consultation and also wants to provide more useful medical advices to him, so the doctor refers to a medical index pamphlet, selects and prints a useful article for Joe.

1. Articles of useful medical information are stored as files in server 62, and each file has a numeric file name, such as 10001 is the file name of the article [Understanding Cholesterol]. The pamphlet that includes the titles and index numbers (that are designed as same as the numeric file names for convenience) of these articles, such as [title: Understanding Cholesterol]=[index number: 10001], is distributed to the doctor.
2. When the doctor thinks it is useful to provide more medical advices and instructions to the patient, the doctor relying on his medical knowledge refers to the pamphlet, and chooses a related article, such as Understanding Cholesterol.
3. The doctor, in keypad 59 or 60 of LAN 50, enters the index number 10001 of the chosen article Understand Cholesterol.
4. The keypad sends the number to server 56,
5. Server 56 checks its cache for the article related to the number. If there is not the article, server 56 executes ftp retrieving server62//10001 and downloads the article with the numeric file name 10001 from server 62 over the Internet.
6. Server 56 prints the article in printer 58, according to keypad 59 or 60.

Highlight. As keypad 54, 59 and 60 all install in a clinic LAN 50 (same as LAN 5 of FIG. 3) to provide professional medical information service, and all medical articles are stored in a known server 62 following a regulation that for any article the index number is same as the numeric file name, so server 56 is customized and configured not to query PNS server, but to go to server 62 directly to download articles. Several doctors may share a printer, and each of them uses his keypad 59 or 60 to print at printer 58.

The invention claimed is:

1. A network printer connected to a network for printing a document in the Internet by a user, comprising:
   a keypad unit for inputting a number from the user;
   first retrieve means for sending said inputted number via Internet to a first server, which translates said number into the information of receiving a document from a second server via Internet and sends said information to said printer, and for receiving said information;
   second retrieve means for, according to said received information, retrieving said document from said second server via Internet;
   print means for printing said received document.

2. The network printer as claimed in claim 1, said information of receiving a document from a second server via Internet is at URL format.

3. The network printer as claimed in claim 1, wherein said information of receiving a document from a second server via Internet further includes the title of said document, and said network printer further comprising:
   a display unit for displaying the title of said document, and prompting the user for confirmation before printing said document.

* * * * *